(12) United States Patent
Björkqvist

(10) Patent No.: US 12,115,710 B2
(45) Date of Patent: Oct. 15, 2024

(54) METHOD AND APPARATUS FOR PRODUCING AN ELASTIC PROFILE WITH LONGITUDINALLY RECURRING TRANSVERSE PROTRUSIONS

(71) Applicant: Trelleborg Sealing Profiles Sweden AB, Värnamo (SE)

(72) Inventor: Markku Björkqvist, Värnamo (SE)

(73) Assignee: TRELLEBORG SEALING PROFILES SWEDEN AB, Värnamo (SE)

( * ) Notice: Subject to any disclaimer, the term of this patent is extended or adjusted under 35 U.S.C. 154(b) by 834 days.

(21) Appl. No.: 16/966,471

(22) PCT Filed: Jan. 31, 2019

(86) PCT No.: PCT/EP2019/052400
§ 371 (c)(1),
(2) Date: Jul. 31, 2020

(87) PCT Pub. No.: WO2019/149831
PCT Pub. Date: Aug. 8, 2019

(65) Prior Publication Data
US 2021/0031427 A1    Feb. 4, 2021

(30) Foreign Application Priority Data

Feb. 2, 2018  (EP) .................................... 18154912

(51) Int. Cl.
*B29C 48/00* (2019.01)
*B29C 43/30* (2006.01)
(Continued)

(52) U.S. Cl.
CPC ........ *B29C 48/0011* (2019.02); *B29C 43/305* (2013.01); *B29C 48/0021* (2019.02);
(Continued)

(58) Field of Classification Search
None
See application file for complete search history.

(56) References Cited

U.S. PATENT DOCUMENTS

| | | |
|---|---|---|
| 3,142,599 A | 7/1964 | Chavannes |
| 4,097,634 A | 6/1978 | Bergh |
| (Continued) | | |

FOREIGN PATENT DOCUMENTS

| | | |
|---|---|---|
| CN | 1781396 A | 6/2006 |
| CN | 203198264 U | 9/2013 |
| (Continued) | | |

OTHER PUBLICATIONS

International Search Report and Written Opinion dated Apr. 2, 2019 for PCT/EP2019/052400 filed on Jan. 31, 2019, 14 pages.

*Primary Examiner* — Barbara J Musser
(74) *Attorney, Agent, or Firm* — XSENSUS LLP

(57) ABSTRACT

A method of producing an elastic profile with longitudinally recurring transverse protrusions includes extruding a primary profile at a primary extruder; extruding a secondary profile at a secondary extruder, the secondary profile includes a substrate layer and transverse protrusions, the secondary extruder includes an extrusion die, wherein a rotating molding wheel forms a wall of the extrusion die, the molding wheel having recesses functioning as molds for the transverse protrusions within the extrusion die; joining the primary profile and the substrate layer of the secondary profile at a joining point for fusion bonding forming a composite structure. A rotating pressing wheel, may press on the composite structure against a bedding separate from the molding wheel. The primary profile may travel along an entirely straight path from the primary extruder to the joining point. The joining occurs at a nip formed between the molding wheel and a flat and stationary bedding.

14 Claims, 3 Drawing Sheets

(51) Int. Cl.
 *B29C 48/12* (2019.01)
 *B29C 48/21* (2019.01)
 *B29C 48/88* (2019.01)
 *B29K 23/00* (2006.01)
 *B32B 25/04* (2006.01)

(52) U.S. Cl.
 CPC .............. *B29C 48/12* (2019.02); *B29C 48/21* (2019.02); *B29C 48/911* (2019.02); *B32B 25/042* (2013.01); *B29K 2023/16* (2013.01)

(56) References Cited

U.S. PATENT DOCUMENTS

| | | | |
|---|---|---|---|
| 4,849,045 | A | 7/1989 | Schmidt |
| 5,508,103 | A | 4/1996 | Cope |
| 6,210,512 | B1 | 4/2001 | Jones |
| 6,709,616 | B2 | 3/2004 | Rhodes |
| 8,678,807 | B2 | 3/2014 | Banker et al. |
| 2001/0042937 | A1 | 11/2001 | Rhodes |
| 2002/0189752 | A1 | 12/2002 | Wetsch |
| 2003/0161999 | A1 | 8/2003 | Kannankeril et al. |
| 2006/0101626 | A1 | 5/2006 | Gallant et al. |
| 2010/0239699 | A1 | 9/2010 | Banker et al. |
| 2014/0057077 | A1 | 2/2014 | Sato et al. |
| 2014/0322379 | A1 | 10/2014 | Hsu |

FOREIGN PATENT DOCUMENTS

| | | |
|---|---|---|
| DE | 3609842 A1 | 9/1987 |
| DE | 102013108537 A1 | 2/2015 |
| EP | 0203906 A2 | 12/1986 |
| EP | 0203906 A3 | 8/1988 |
| EP | 0580073 A2 | 1/1994 |
| EP | 0580073 A3 | 6/1994 |
| EP | 0857563 A1 | 8/1998 |
| GB | 2516431 A | 1/2015 |
| WO | 2016/202534 A1 | 12/2016 |

METHOD AND APPARATUS FOR PRODUCING AN ELASTIC PROFILE WITH LONGITUDINALLY RECURRING TRANSVERSE PROTRUSIONS

CROSS-REFERENCE TO RELATED APPLICATIONS

The present application is based on PCT filing PCT/EP2019/052400, filed Jan. 31, 2019, which claims priority to EP 18154912.2, filed Feb. 2, 2018, the entire contents of each are incorporated herein by reference.

FIELD OF TECHNOLOGY

The present inventive concept relates to a method of producing an elastic profile with longitudinally recurring transverse protrusions and an apparatus for manufacturing the same.

BACKGROUND

Elastic profiles are useful, for example, for joining and/or sealing between structures. They can be made from materials such as thermoplastic elastomers (TPEs), natural rubber, or synthetic rubbers such as EPDM. Such structures may be manufactured through extrusion through an extrusion die.

Geometrically, in a strict sense, a profile is three-dimensional object generated by sweeping a two-dimensional outline, corresponding to the extrusion die, in a third longitudinal dimension. Thus, it has a constant cross-section as one moves along the longitudinal direction.

However, in various applications, it is useful to have transverse protrusions that extend from the profile proper and that may vary in the longitudinal direction. Various methods for fabricating such profiles with "three-dimensional" structures are known in the prior art.

EP0203906A2 discloses, in the context of making a laminate, a process comprising providing at least one rotating drum having in the peripheral surface thereof a plurality of cavities, extruding onto the peripheral surface of said drum a molten thermoplastic material under sufficient pressure to cause the molten thermoplastic material to enter said cavities, to form a three-dimensional layer having a plurality of elongated projections extending from a backing having an exposed surface; and then, while said three-dimensional layer remains on said drum, applying a near molten extruded sheet subsubstrate layer of thermoplastic material onto the exposed surface of said three-dimensional layer, at least one of said layers being at temperatures sufficient to cause said layers to fusion bond to each other.

There is always a need to improve such manufacturing methods and apparatuses.

SUMMARY

To this end, according to a first method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding at a joining point, forming a composite structure; and pressing on the composite structure with a rotating pressing wheel, against a bedding separate from the molding wheel.

Pressing on the composite structure using a pressing wheel against a bedding separate from the molding wheel allows the pressing wheel to be specifically adapted to press the substrate layer of the secondary profile onto the primary profile without damaging the transverse protrusions. For example, the pressing wheel may have one or more recesses. The recesses may be shaped so that the pressing wheel only touches the substrate layer and not the transverse protrusions. This way, the pressing wheel may press harder on the composite structure than otherwise would be possible without damaging the transverse protrusions, leading to a better bond between the substrate of the secondary profile and the primary profile. For example, the pressing wheel may have recesses slightly wider and deeper than those of the molding wheel.

Rotation of the pressing wheel may be synchronized with rotation of the molding wheel to match up recesses of the pressing wheel with those of the molding wheel.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

The joining point may be at the perimeter of the molding wheel and may be a nip, which may be formed between the molding wheel and a preferably flat bedding, wherein the bedding preferably is stationary. Such a nip allows for firm pressing on the composite structure already at the joining point, allowing to a good bonding between the substrate of the secondary profile and the primary profile in a relatively simple apparatus.

Further, according to a first apparatus aspect, there is provided an apparatus for producing an elastic profile with longitudinally recurring transverse protrusions, comprising a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; a joining point for joining the primary profile and the secondary profile through fusion bonding, forming a composite structure; and a rotatable pressing wheel arranged for pressing on the composite structure against a bedding separate from the molding wheel.

The pressing wheel may have one or more recesses providing clearance compared to the corresponding recesses of the molding wheel, i.e., if the corresponding recess of the molding wheel would be imagined to be transported to and compared with the recess of the pressing wheel, the surface of the recess of the molding wheel would be entirely contained within the surface of the recess of the pressing wheel, with the two aligned relative to how they each would align relative the same transverse projection of the composite structure.

Effects and features of this first apparatus aspect are analogous to those described above in connection with the first method aspect. Embodiments mentioned in relation to the first method aspect are compatible with the first apparatus aspect.

Further, according to a second method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding, forming a composite structure, the joining occurring at a joining point, the entire path along which the primary profile travels from the primary extruder to the joining point being straight.

An arrangement where the primary profile travels along an entirely straight path from the primary extruder to the joining point allows for the extruder to be placed closer to the joining point. This results in less heat being lost on the way, which in turn allows for better temperature control of the fusion bonding process, as no re-heating is required. Further, energy is saved.

For example, the output of the primary extruder may be placed within 20 cm or more preferably within 15 cm of the joining point.

The joining point may be at the perimeter of the molding wheel and may be a nip, which may be formed between the molding wheel and a preferably flat bedding, wherein the bedding preferably is stationary. Such a nip allows for firm pressing on the composite structure at the joining point, allowing to a good bond between the substrate of the secondary profile and the primary profile in a relatively simple apparatus.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

Further, according to a second apparatus aspect, there is provided an apparatus for producing an elastic profile with longitudinally recurring transverse protrusions, comprising a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; and a joining point at the molding wheel for joining the primary profile and the secondary profile through fusion bonding, forming a composite structure, the primary extruder and the joining point being arranged so that the entire path along which the primary profile, during operation of the apparatus, travels between the primary extruder and the joining point is straight.

Effects and features of this second apparatus aspect are analogous to those described above in connection with the second method aspect. Embodiments mentioned in relation to the second method aspect are compatible with the second apparatus aspect.

Further, according to a third method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding, forming a composite structure, the joining occurring at a nip formed between the molding wheel and a flat bedding.

Such a nip allows for firm pressing on the composite structure at the joining point, allowing to a good bond between the substrate of the secondary profile and the primary profile in a relatively simple apparatus.

The bedding may be stationary.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

Further, according to a third apparatus aspect, there is provided an apparatus for producing an elastic profile with longitudinally recurring transverse protrusions, comprising: a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; and a nip formed between the molding wheel and a flat bedding for joining the primary profile and the secondary profile through fusion bonding, forming a composite structure.

Effects and features of this third apparatus aspect are analogous to those described above in connection with the third method aspect. Embodiments mentioned in relation to the third method aspect are compatible with the third apparatus aspect.

BRIEF DESCRIPTION OF THE DRAWINGS

The above, as well as additional objects, features and advantages of the present inventive concept, will be better understood through the following illustrative and non-limiting detailed description of preferred embodiments, with reference to the appended drawings, where the same reference numerals will be used for similar elements, wherein.

DETAILED DESCRIPTION

Figure 1:
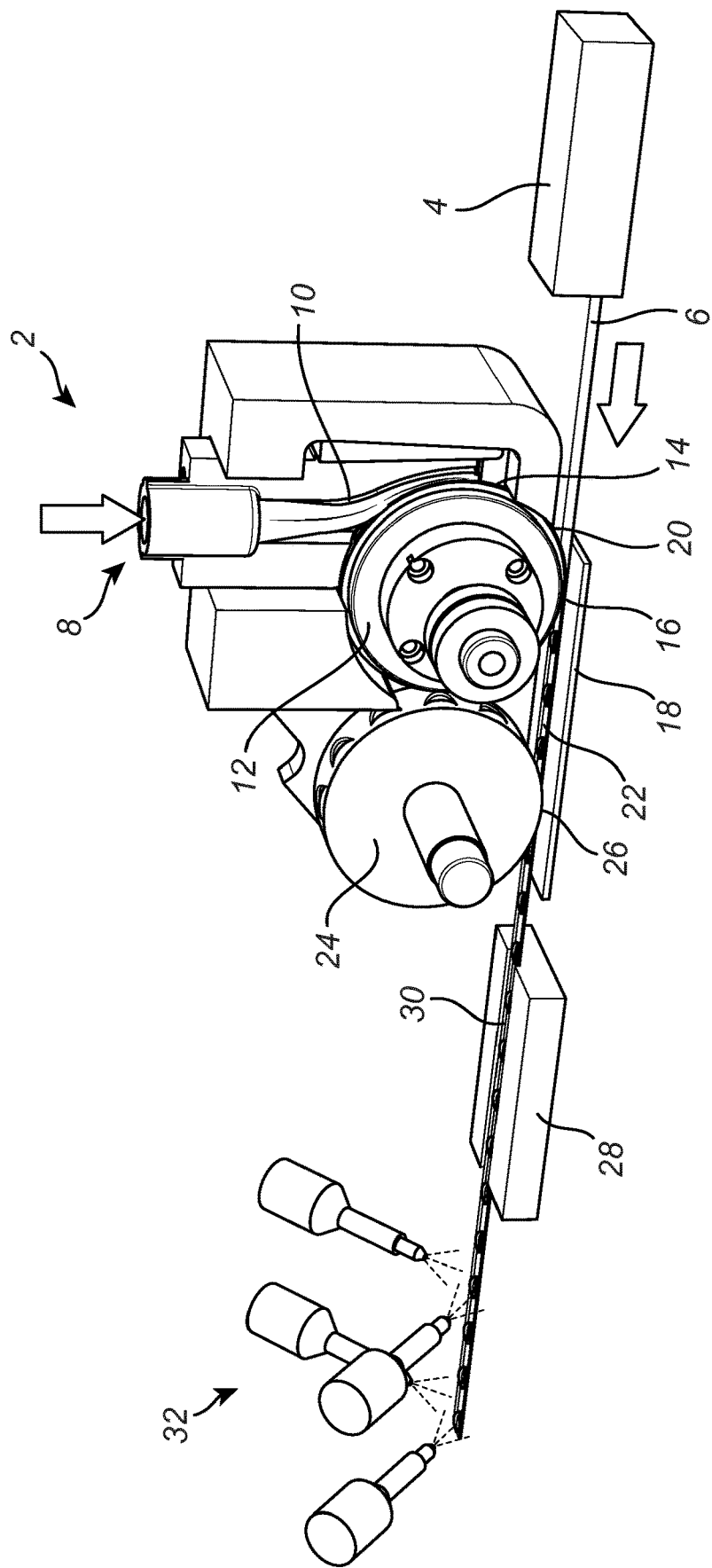
FIG. 1 is a perspective view showing the apparatus.

FIG. 1 provides an overview of the apparatus. A primary extruder 4 arranged for extruding a primary profile 6. A secondary extruder 8 is arranged for extruding a secondary profile 20. A chamber 10 functions as an extrusion die for the secondary extruder 8. A molding wheel 12 provides an inner wall of the chamber 10. The molding wheel 12 has recesses whose function will be described in more detail in conjunction with FIGS. 2 and 3 below. At its lower end, the chamber 10 is limited by a gap 14 between the molding wheel 12 and the opposite wall of the chamber 10. The extruders may extrude materials such as natural rubber, synthetic rubber, such as EPDM, or thermoplastic elastomers (TPEs). Several materials, such as different grades of EPDM, may be co-extruded by the primary extruder 4 and/or he secondary extruder 20. The molding wheel 12 may be internally water cooled.

The secondary profile 20 travels along the perimeter of the molding wheel 12 to a nip 16 between the molding wheel 12 and a bedding 18. The nip 16 functions as a joining point of the primary profile 6, which has traveled along a straight path between the primary extruder 4 and the nip 16, and the secondary profile 20, forming a composite structure 22. The outlet of the primary extruder 4 is placed close to the nip 16, preferably at a distance within 20 cm, for example at a distance of 15 cm. Downstream of the molding wheel 12, there is a second, pressing wheel 24 arranged for pressing on the composite structure.

As is evident from FIG. 1, the entire path along which the primary profile travels between the primary extruder 4 and the nip 16 is straight.

Downstream of the pressing wheel 24, there is a sizing arrangement 28 with a profile 30 matching the outer profile of the composite structure 22. Finally, further again downstream, water is sprayed by nozzles 32 for cooling the composite structure 22.

Figure 2:
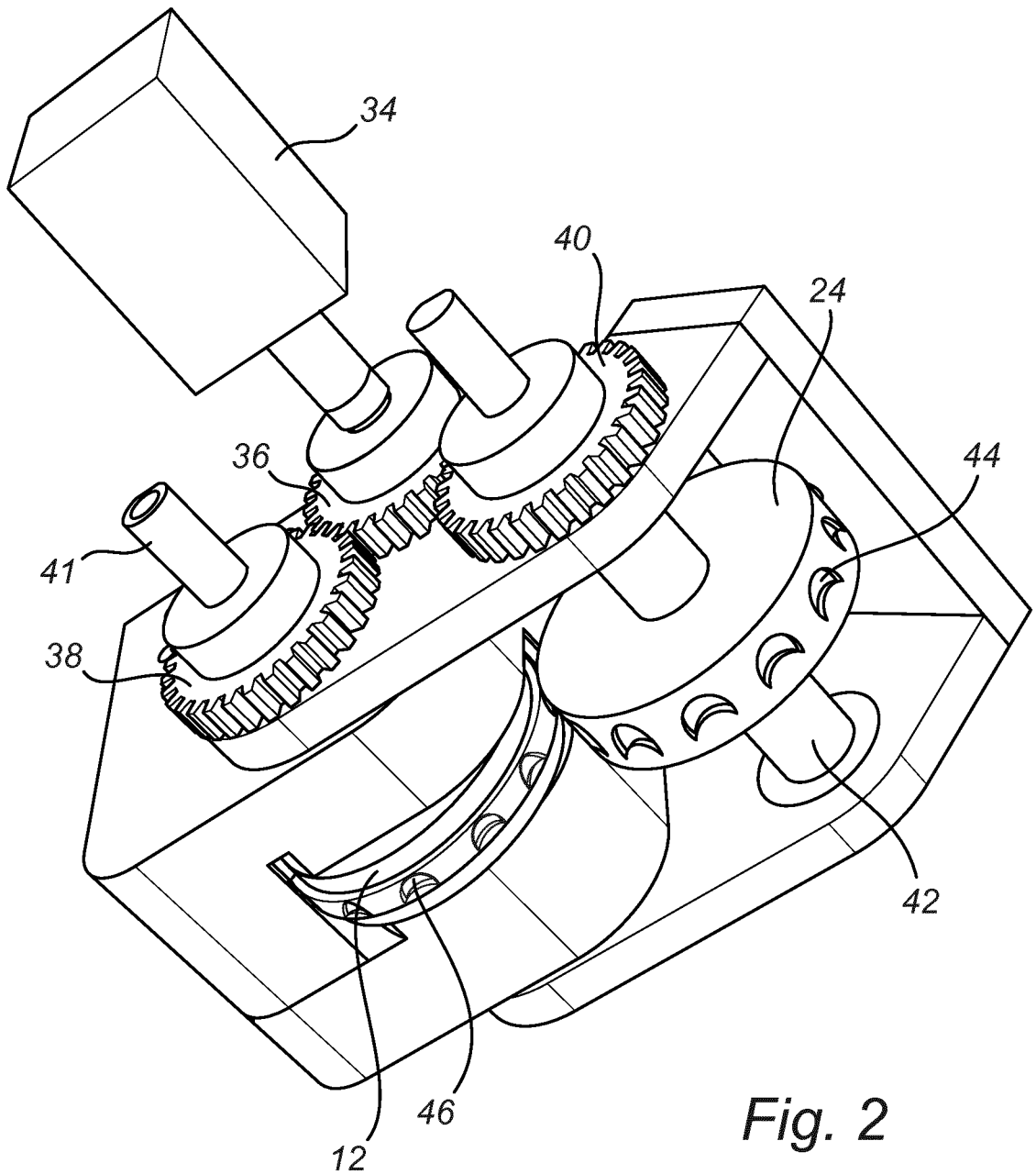
FIG. 2 is a perspective view showing details of the molding wheel and the pressing wheel, and the driving mechanism of the molding wheel and the pressing wheel.

FIG. 2 shows parts of the apparatus 2 from below, showing details of the molding wheel 12, the pressing wheel 24 and their suspension and driving mechanism. A motor 34 drives a driving cogwheel 36 which engages a first cogwheel 38 connected to the molding wheel 12 through a first shaft 41 and a second cogwheel 40 connected to the pressing wheel 24 through a second shaft 42. Thus, both the molding wheel 12 and the pressing wheel 24 are driven by the motor 34 and the rotation of both wheels 12, 24 are synchronized. The gear ratios between the driving cogwheel 36 and the first cogwheel 38 and between the driving cogwheel 36 and the second cogwheel 40 are identical so that the rate of rotation of the molding wheel 12 and of the pressing wheel 24 are identical.

The molding wheel 12 has recesses 46 serving as molds for the protrusions 48 within the chamber 10 (cf. FIG. 1). The pressing wheel 24 has recesses 44 of the same shape as the molding wheel 12, but larger. The molding wheel 12 and the pressing wheel 24 are arranged so that a protrusion 48 molded by a recess 46 of the molding wheel will, as the composite structure 22 reaches the pressing wheel 24, line up with a corresponding recess 44 of the pressing wheel.

Figure 3:
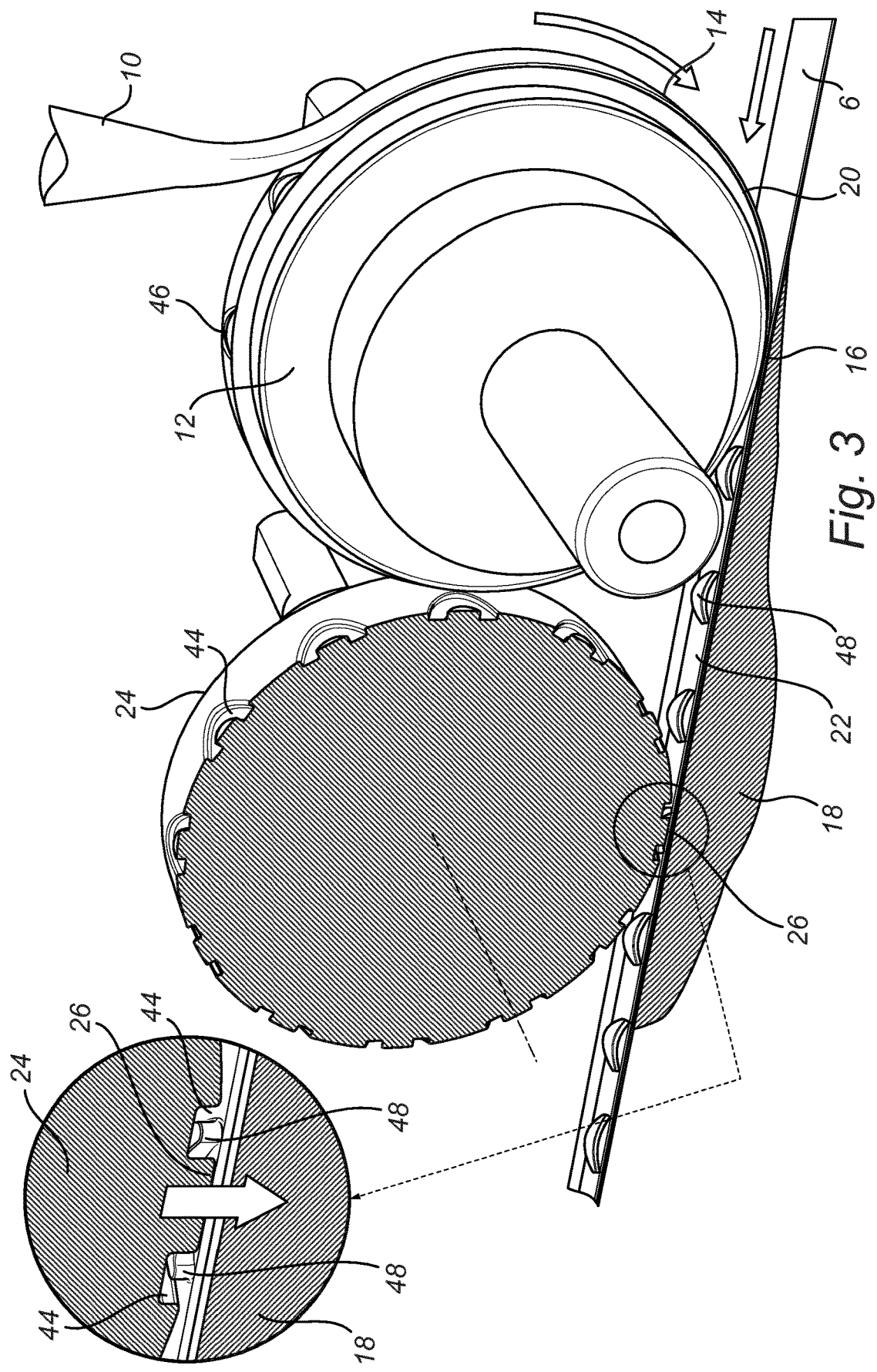
FIG. 3 is a perspective and partly cross-sectional view showing the operation of the molding wheel and the pressing wheel.

FIG. 3 shows the principle of operation of the secondary extruder 8 (cf. FIG. 1), the molding wheel 12, and the pressing wheel 24. The primary profile moves horizontally along a straight path from the primary extruder 4 (cf. FIG. 1) to the nip 16, possibly supported by a bedding (not shown).

Within the chamber 10, the recesses 46 of the molding wheel 12 serve as molds for the protrusions 48 of the secondary profile 20. Further, the secondary profile 20 will have a substrate layer formed by the space in the chamber 10 outside the molding wheel 12 and its recesses 46, ultimately being shaped by the gap 14 between the molding wheel 12 and the opposite wall of the chamber 10 at the lower end of the chamber 10. With the molding wheel 12 rotating, the secondary profile 20 is transported along the outer periphery of the molding wheel 12 to the nip 16, where the substrate layer of the secondary profile 20 meets the primary profile 6, for joining the two through fusion bonding. In the nip 16, the molding wheel 12 presses on the secondary profile 20 and the primary profile 6 against a flat, stationary bedding 18.

The resulting composite structure 22 then travels on to a second nip 26 between the pressing wheel 24 and the bedding 18, where the pressing wheel 24 presses on the composite structure 22. Thus, the pressing wheel 24, which is separate and distinct from the molding wheel 12, presses on the composite structure 22 against the bedding 18, which is separate and distinct from the molding wheel 12.

The recesses 44 of the pressing wheel 24 are larger, i.e., slightly wider and deeper than the corresponding recesses 46 of the molding wheel, so that the pressing wheel only touches the substrate layer of the secondary profile 20 and not the protrusions 48.

Summing up, with reference to FIGS. 1, 2, and 3, there is produced an elastic profile 22 with longitudinally recurring transverse protrusions 48. A primary profile 6 is extruded at a primary extruder 4. A secondary profile 20 is extruded at a secondary extruder 8. The secondary profile 20 comprises a substrate layer and transverse protrusions 48. The secondary extruder comprises an extrusion die in the form of the chamber 10, wherein a rotating molding wheel 12 forms a wall of the extrusion die. The molding wheel 20 has recesses 46 functioning as molds for the transverse protrusions 48 within the extrusion die; joining the primary profile 6 and the substrate layer of the secondary profile 20 at a joining point, which is the nip 16, for fusion bonding, forming a composite structure 22. The nip is formed between the molding wheel 12 and a flat, stationary bedding 18. The molding wheel 12 may be water cooled through internal channels therein (not shown).

The composite structure 22 may be pressed on at the nip 26 with a rotating pressing wheel 24 separate from the molding wheel 20. The pressing wheel 24 may have one or more recesses 44 shaped so that the pressing wheel 24 only touches the substrate layer and not the transverse protrusions 48, in other words the recesses 44 providing clearance compared to the corresponding recesses 46 of said molding wheel 12.

The primary profile 6 travels along a straight path from the primary extruder 4 to the joining point in form of the nip 16.

In the above the inventive concept has mainly been described with reference to a limited number of examples. However, as is readily appreciated by a person skilled in the art, other examples than the ones disclosed above are equally possible within the scope of the inventive concept, as defined by the appended claims. For example, the joining of the primary profile 6 and the secondary profile 20 may happen between the molding wheel 12 and a second wheel or roll instead of against the bedding 18. The bedding 18 may be moving with the primary profile 6 and the composite structure 22 instead of being stationary. The transverse protrusions 48 and corresponding recesses 46 of the molding wheel 12 and the recesses 44 of the pressing wheel 24 are shown as being crescent shaped for illustration, however, this can be adjusted to any desires shape according to need. The molding wheel 12 and the pressing wheel 24 may be driven by any suitable driving mechanism or mechanisms, which may be different from the one described above in conjunction with FIG. 2.

The following summarizes examples.

According to a first method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding at a joining point, forming a composite structure; and pressing on the composite structure with a rotating pressing wheel, separate from the molding wheel.

Using a pressing wheel separate from the molding wheel allows the pressing wheel to be specifically adapted to press the substrate layer of the secondary profile onto the primary profile without damaging the transverse protrusions. For example, the pressing wheel may have one or more recesses. The recesses may be shaped so that the pressing wheel only touches the substrate layer and not the transverse protrusions. This way, the pressing wheel may press harder on the composite structure than otherwise would be possible without damaging the transverse protrusions, leading to a better bond between the substrate of the secondary profile and the primary profile. For example, the pressing wheel may have recesses slightly wider and deeper than those of the molding wheel.

Rotation of the pressing wheel may be synchronized with rotation of the molding wheel to match up recesses of the pressing wheel with those of the molding wheel.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

The joining point may be at the perimeter of the molding wheel and may be a nip, which may be formed between the molding wheel and a preferably flat bedding, wherein the bedding preferably is stationary. Such a nip allows for firm pressing on the composite structure already at the joining point, allowing to a good bonding between the substrate of the secondary profile and the primary profile in a relatively simple apparatus.

Further, according to a first apparatus aspect, there is provided an apparatus for producing an elastic profile with longitudinally recurring transverse protrusions, comprising a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; a joining point for joining the primary profile and the secondary profile through fusion bonding, forming a composite structure; and a rotatable pressing wheel arranged for pressing on the composite structure, the pressing wheel being separate from the molding wheel.

The pressing wheel may have one or more recesses providing clearance compared to the corresponding recesses of the molding wheel, i.e., if the corresponding recess of the molding wheel would be imagined to be transported to and compared with the recess of the pressing wheel, the surface of the recess of the molding wheel would be entirely contained within the surface of the recess of the pressing wheel, with the two aligned relative to how they each would align relative the same transverse projection of the composite structure.

Effects and features of this first apparatus aspect are analogous to those described above in connection with the first method aspect. Embodiments mentioned in relation to the first method aspect are compatible with the first apparatus aspect.

Further, according to a second method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding, forming a composite structure, the joining occurring at a joining point, the primary profile traveling along a straight path from the primary extruder to the joining point.

An arrangement where the primary profile travels along a straight path from the primary extruder to the joining point allows for the extruder to be placed closer to the joining point. This results in less heat being lost on the way, which in turn allows for better temperature control of the fusion bonding process, as no re-heating is required. Further, energy is saved.

For example, the output of the primary extruder may be placed within 20 cm or more preferably within 15 cm of the joining point.

The joining point may be at the perimeter of the molding wheel and may be a nip, which may be formed between the molding wheel and a preferably flat bedding, wherein the bedding preferably is stationary. Such a nip allows for firm pressing on the composite structure at the joining point, allowing to a good bond between the substrate of the secondary profile and the primary profile in a relatively simple apparatus.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

Further, according to a second apparatus aspect, there is provided an apparatus for producing an elastic profile with longitudinally recurring transverse protrusions, comprising a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; and a joining point at the molding wheel for joining the primary profile and the secondary profile through fusion bonding, forming a composite structure, the primary extruder and the joining point being arranged so that the primary profile, during operation of the apparatus, travels along a straight path between the primary extruder and the joining point.

Effects and features of this second apparatus aspect are analogous to those described above in connection with the second method aspect. Embodiments mentioned in relation to the second method aspect are compatible with the second apparatus aspect.

Further, according to a third method aspect, there is provided a method of producing an elastic profile with longitudinally recurring transverse protrusions, comprising extruding a primary profile at a primary extruder; extruding a secondary profile at a secondary extruder, the secondary profile comprising a substrate layer and transverse protrusions, the secondary extruder comprising an extrusion die, wherein a rotating molding wheel forms a wall of the extrusion die, the molding wheel having recesses functioning as molds for the transverse protrusions within the extrusion die; joining the primary profile and the substrate layer of the secondary profile through fusion bonding, forming a composite structure, the joining occurring at a nip formed between the molding wheel and a preferably flat bedding, wherein the bedding preferably is stationary.

Such a nip allows for firm pressing on the composite structure at the joining point, allowing to a good bond between the substrate of the secondary profile and the primary profile in a relatively simple apparatus.

The primary profile and/or the secondary profile may at least partly comprise natural rubber or a synthetic rubber, such as EPDM. Alternatively, or additionally, the primary profile and/or the secondary profile at least partly comprises a thermoplastic elastomer (TPE).

The molding wheel may be internally water cooled, which allows for good control of the temperature of the wheel.

Further, according to a third apparatus aspect, there is provided an apparatus for producing an elastic profile with longitudinally recurring transverse protrusions, comprising: a primary extruder arranged for extruding a primary profile, a secondary extruder arranged for extruding a secondary profile, the secondary profile comprising a substrate layer and transverse protrusions, the secondary extruder comprising an extrusion die, wherein a rotatable molding wheel forms a wall of the extrusion die, the molding wheel having recesses functioning as molds for the transverse protrusions within the extrusion die; and a nip formed between the molding wheel and a preferably flat bedding for joining the primary profile and the secondary profile through fusion bonding, forming a composite structure, wherein the bedding preferably is stationary.

Effects and features of this third apparatus aspect are analogous to those described above in connection with the third method aspect. Embodiments mentioned in relation to the third method aspect are compatible with the third apparatus aspect.

The following lists examples just summarized.

1. A method of producing an elastic profile with longitudinally recurring transverse protrusions, comprising:
   extruding a primary profile (6) at a primary extruder (4);
   extruding a secondary profile (20) at a secondary extruder (8), said secondary profile (20) comprising a substrate layer and transverse protrusions (48), said secondary extruder (8) comprising an extrusion die (10), wherein a rotating molding wheel (12) forms a wall of said extrusion die (10), said molding wheel (12) having recesses (46) functioning as molds for said transverse protrusions (48) within said extrusion die (10);
   joining said primary profile (6) and said substrate layer of said secondary profile (20) at a joining point (16) for fusion bonding forming a composite structure (22); and
   pressing on said composite structure with a rotating pressing wheel (24), separate from said molding wheel (12).

2. The method of example 1, wherein said pressing wheel (24) has one or more recesses (44) shaped so that said pressing wheel (24) only touches said substrate layer and not said transverse protrusions (48).

3. An apparatus (2) for producing an elastic profile with longitudinally recurring transverse protrusions, comprising:
   a primary extruder (4) arranged for extruding a primary profile (6),
   a secondary extruder (8) arranged for extruding a secondary profile (20), said secondary profile (20) comprising a substrate layer and transverse protrusions (48), said secondary extruder (8) comprising an extrusion die (10), wherein a rotatable molding wheel (12) forms a wall of said extrusion die, said molding wheel (12) having recesses (46) functioning as molds for said transverse protrusions (48) within said extrusion die;
   a joining point (16) for joining said primary profile (6) and said secondary profile (20) for fusion bonding, forming a composite structure (22); and
   a rotatable pressing wheel (24) arranged for pressing on said composite structure, said pressing wheel (24) being separate from said molding wheel (12).

4. The apparatus (2) of example 3, wherein said pressing wheel (24) has one or more recesses (44) providing clearance compared to the corresponding recesses (46) of said molding wheel (12).

5. The method of example 1 or 2 or the apparatus of example 3 or 4, wherein rotation of said pressing wheel (24) is synchronized with rotation of said molding wheel (12).

6. A method of producing an elastic profile with longitudinally recurring transverse protrusions, comprising:
   extruding a primary profile (6) at a primary extruder (4);
   extruding a secondary profile (20) at a secondary extruder (8), said secondary profile (20) comprising a substrate layer and transverse protrusions (48), said secondary extruder (8) comprising an extrusion die (10), wherein a rotating molding wheel (12) forms a wall of said extrusion die (10), said molding wheel (12) having recesses (46) functioning as molds for said transverse protrusions (48) within said extrusion die (10);
   joining said primary profile (6) and said substrate layer of said secondary profile (20) for fusion bonding forming a composite (20) structure, said joining occurring at a joining point (16), said primary profile (6) traveling along a straight path from said primary extruder (4) to said joining point (16).

7. An apparatus (2) for producing an elastic profile with longitudinally recurring transverse protrusions, comprising:
   a primary extruder (4) arranged for extruding a primary profile (6),
   a secondary extruder (8) arranged for extruding a secondary profile (20), said secondary profile (20) comprising a substrate layer and transverse protrusions (48), said secondary extruder (8) comprising an extrusion die (10), wherein a rotatable molding wheel (12) forms a wall of said extrusion die (10), said molding wheel (12) having recesses (46) functioning as molds for said transverse protrusions (48) within said extrusion die; and a joining point (16) at said molding wheel for joining said primary profile (6) and said secondary profile (20) for fusion bonding, forming a composite structure (22), said primary extruder (6) and said joining point (16) being arranged so that said primary profile (6), during operation of said apparatus (2), travels along a straight path between said primary extruder (4) and said joining point (16).

8. The method of example 1, 2, 5, or 6 or the apparatus of example 3, 4, 5, or 7 wherein said joining point (16) is on the perimeter of said molding wheel (12).

9. The method of example 1, 2, 5, 6, or 8 or the apparatus of example 3, 4, 5, 7 or 8 wherein said joining point is at a nip.

10. The method or apparatus of example 9, wherein said nip (16) is formed between said molding wheel (12) and a preferably flat bedding (18), wherein said bedding (18) preferably is stationary.

11. A method of producing an elastic profile with longitudinally recurring transverse protrusions, comprising:
extruding a primary profile (6) at a primary extruder (4);
extruding a secondary profile (20) at a secondary extruder (8), said secondary profile (20) comprising a substrate layer and transverse protrusions (48), said secondary extruder (8) comprising an extrusion die (10), wherein a rotating molding wheel (12) forms a wall of said extrusion die (10), said molding wheel (12) having recesses (46) functioning as molds for said transverse protrusions (48) within said extrusion die (10);
joining said primary profile (6) and said substrate layer of said secondary profile (20) for fusion bonding forming a composite structure (22), said joining occurring at a nip (16) formed between said molding wheel (12) and a preferably flat bedding (18), wherein said bedding (18) preferably is stationary.

12. An apparatus (2) for producing an elastic profile with longitudinally recurring transverse protrusions, comprising:
a primary extruder (4) arranged for extruding a primary profile (6),
a secondary extruder (8) arranged for extruding a secondary profile (20), said secondary profile (20) comprising a substrate layer and transverse protrusions (48), said secondary extruder (8) comprising an extrusion die (10), wherein a rotatable molding wheel (12) forms a wall of said extrusion die (10), said molding wheel (12) having recesses (46) functioning as molds for said transverse protrusions (48) within said extrusion die; and
a nip (16) formed between said molding wheel (12) and a preferably flat bedding (18) for joining said primary profile (6) and said secondary profile (6) for fusion bonding forming a composite structure (22), wherein said bedding (18) preferably is stationary.

13. The method or apparatus (2) of any one of the preceding examples, wherein said primary profile (6) and/or said secondary profile (20) at least partly comprises natural rubber or a synthetic rubber, such as EPDM.

14. The method or apparatus (2) of any one of the preceding examples, wherein said primary profile (6) and/or said secondary profile (20) at least partly comprises a thermoplastic elastomer (TPE).

15. The method or apparatus (2) of any one of the preceding examples, wherein said molding wheel (12) is internally water cooled.

The invention claimed is:

1. A method of producing an elastic profile with longitudinally recurring transverse protrusions, comprising:
extruding a primary profile at a primary extruder;
extruding a secondary profile at a secondary extruder, said secondary profile comprising a substrate layer and transverse protrusions, said secondary extruder comprising an extrusion die, wherein a rotating molding wheel forms a wall of said extrusion die, said molding wheel having recesses functioning as molds for said transverse protrusions within said extrusion die; and
joining said primary profile and said substrate layer of said secondary profile by fusion bonding to form a composite structure, said joining occurring at a nip formed between said molding wheel and a moving flat bedding.

2. The method of claim 1, wherein said primary profile and/or said secondary profile at least partly comprises a natural rubber or a synthetic rubber.

3. The method of claim 2, wherein said primary profile and/or said secondary profile at least partially comprises EPDM.

4. The method of claim 1, wherein said primary profile and/or said secondary profile at least partly comprises a thermoplastic elastomer (TPE).

5. The method of claim 1, wherein said molding wheel is internally water cooled.

6. The method of claim 1, wherein the entire path along which the primary profile travels from the primary extruder to the nip is straight.

7. The method of claim 1, wherein said primary extruder is located within 20 cm of said nip.

8. The method of claim 1, wherein said primary extruder is located within 15 cm of said nip.

9. An apparatus for producing an elastic profile with longitudinally recurring transverse protrusions, comprising:
a primary extruder arranged for extruding a primary profile,
a secondary extruder arranged for extruding a secondary profile, said secondary profile comprising a substrate layer and transverse protrusions, said secondary extruder comprising an extrusion die, wherein a rotatable molding wheel forms a wall of said extrusion die, said molding wheel having recesses functioning as molds for said transverse protrusions within said extrusion die; and
a nip formed between said molding wheel and a moving flat bedding, for joining said primary profile and said secondary profile for fusion bonding forming a composite structure.

10. The apparatus of claim 9, wherein the entire path along which the primary profile travels from the primary extruder to the nip is straight.

11. The apparatus of claim 9, wherein said primary extruder is located within 20 cm of said nip.

12. The apparatus of claim 9, wherein said primary extruder is located within 15 cm of said nip.

13. A method of producing an elastic profile with longitudinally recurring transverse protrusions, comprising:
extruding a primary profile at a primary extruder;
extruding a secondary profile at a secondary extruder, said secondary profile comprising a substrate layer and transverse protrusions, said secondary extruder comprising an extrusion die, wherein a rotating molding wheel forms a wall of said extrusion die, said molding wheel having recesses functioning as molds for said transverse protrusions within said extrusion die; and
joining said primary profile and said substrate layer of said secondary profile by fusion bonding to form a composite structure, said joining occurring at a nip formed between said molding wheel and a flat bedding, wherein a pressing wheel that is separate and distinct from the molding wheel, presses on the composite structure against the bedding and includes recesses that touch said substrate layer but do not touch said transverse protrusions.

14. An apparatus for producing an elastic profile with longitudinally recurring transverse protrusions, comprising:

a primary extruder arranged for extruding a primary profile, a secondary extruder arranged for extruding a secondary profile, said secondary profile comprising a substrate layer and transverse protrusions, said secondary extruder comprising an extrusion die, wherein a rotatable molding wheel forms a wall of said extrusion die, said molding wheel having recesses functioning as molds for said transverse protrusions within said extrusion die; and a nip formed between said molding wheel and a flat bedding for joining said primary profile and said secondary profile for fusion bonding forming a composite structure, wherein a pressing wheel that is separate and distinct from the molding wheel, presses on the composite structure against the bedding and includes recesses that touch said substrate layer but do not touch said transverse protrusions.

* * * * *